US006149191A

United States Patent [19]
Rink

[11] Patent Number: 6,149,191
[45] Date of Patent: Nov. 21, 2000

[54] CARBORANE-CONTAINING AIRBAG INFLATOR

[75] Inventor: Karl K. Rink, Liberty, Utah

[73] Assignee: Autoliv ASP, Inc., Ogden, Utah

[21] Appl. No.: 09/193,177

[22] Filed: Nov. 16, 1998

[51] Int. Cl.$^7$ ................................................ B60R 21/26
[52] U.S. Cl. .......................................... 280/736; 280/737
[58] Field of Search .................................... 280/736, 737, 280/741; 149/22, 1

[56] References Cited

U.S. PATENT DOCUMENTS

| | | |
|---|---|---|
| 3,764,417 | 10/1973 | Hill et al. . |
| 5,470,104 | 11/1995 | Smith et al. . |
| 5,494,312 | 2/1996 | Rink . |
| 5,531,473 | 7/1996 | Rink et al. . |
| 5,542,688 | 8/1996 | Scheffee . |
| 5,607,181 | 3/1997 | Richardson et al. ..................... 280/737 |
| 5,683,104 | 11/1997 | Smith ...................................... 280/736 |
| 5,979,936 | 11/1999 | Moore et al. ........................... 280/736 |

OTHER PUBLICATIONS

Catherine E. Housecroft, Ph.D.: *Boranes and Metallaboranes, Structure, Bonding and Reactivity*, 2nd Ed., Ellis Horwood, Halsted Press, Chapters 1–3 and 7, 1990.
*Kirk–Othmer Encyclopedia of Chemical Technology*, 2nd Ed., vol. 3, 698–699 and 705, pre–1978.
*Kirk–Othmer Encyclopedia of Chemical Technology*, 3nd Ed., vol. 4, 162–166 and 108–110, c.1978–1984.
*Kirk–Othmer Encyclopedia of Chemical Technology*, 3nd Ed., vol. 4, 185, 187, c.1978–1984.
*Kirk–Othmer Encyclopedia of Chemical Technology*, 4th Ed., vol. 4, 465–470, c.1991.
*Kirk–Othmer Encyclopedia of Chemical Technology*, 4th Ed., vol. 4, 501–502, c.1991.
Chemical Abstract 116:59424 CA, Copyright 1995 ACS.
Chemical Abstract 82:42373 CA, Copyright 1995 ACS.
Chemical Registry 120947–88–8, Copyright 1995 ACS.
Chemical Registry 45979–03–1, Copyright 1995 ACS.
Chemical Registry 45979–02–0, Copyright 1995 ACS.
K. Wade: Patterns in Cluster Chemistry: Boranes as Model Systems, Boron Chemistry–4, Plenary and Session Lectures presented at the 4th International Meeting on Boron Chemistry, Utah, Jul. 1979, Pergamon Press 23–32.
V.L. Stano et al.: The Chemistry of Decaborane and Its Derivatives, *Russian Chemical Reviews*, vol. 34, No. 6, 424–439, Jun. 1965.
Roald Hoffmann et al.: Theory of Polyhedral Molecules. III. Population Analyses and Reactivities for the Carboranes, *The Journal of Chemical Physics*, vol. 36, No. 12, 3489–3493, Jun. 1962.
J.F. Ditter et al.: Direct Synthesis of closo–Carboranes, *Inorganic Chemistry*, vol. 9, No. 4, 889–892, Apr. 1970.
Roald Hoffmann et al.: Intramolecular Isomerization and Transformations in Carboranes and Substituted Polyhedral Molecules, *Inorganic Chemistry*, vol. 2, No. 1, 231–232, Feb. 1963.
M.A. Grassberger et al.: Boron Compounds. XIII., *Journal of the American Chemical Society*, 90:1, 56–58, Jan. 1968.
V.G. Slutsky et al.: On a Possibility of Underwater Unconfined Explosions With the Use of Water as an Oxidant, 15th International Colloquium on the Cynamics of Explosion and Reaction Systems, Univ. of Colorado at Boulder, Jul. 31–Aug. 4, 1995.

(List continued on next page.)

*Primary Examiner*—Paul N. Dickson
*Assistant Examiner*—Faye M. Fleming
*Attorney, Agent, or Firm*—Sally J. Brown

[57] ABSTRACT

Apparatus and methods for inflating an inflatable device which are based on the reaction of a carborane fuel material and an oxidant, such as water. Thus, the invention can desirably avoid the need for the storage of reactants under relatively high pressures.

36 Claims, 4 Drawing Sheets

OTHER PUBLICATIONS

E.V. Bespalov et al.: Reactivity of Carborane–4 In Water Vapor, Plenum Publishing Corp., Translated from Doklady Akademii Nauk SSSR, vol. 317, No. 3, 661–663, Mar. 1991.

V.N. Kalinin et al.: Investigation of the Reactivity and the Ignition Mechanism in Carborane–4, Plenum Publishing Corp., Translated from Fizika Goreniya i Vzryva, vol. 25, No. 2, 16–22, Mar.–Apr. 1989.

V.G. Slutsky et al.: The Mechanism of High–Temperature Oxidation of Carborane $C_2B_4H_6$ by Water Vapor, paper presented at 27th International Symposium on Combustion, University of Colorado at Boulder, Aug. 2–7, 1998.

G.O. Spessard et al.: Cluster Compounds, *Organometallic Chemistry*, Prentice–Hall, Inc., 455–466, 1997.

Russell N. Grimes: *Carboranes*, xiii–13, Academic Press, 1970.

Robert E. Williams: *Progress in Borane Chemistry*, vol. 2, 37–119.

I. Shapiro et al.: The Carborane Series: $B_aC_2H_{a+2}$. I. $B_3C_2H_5$, *Journal of the American Chemical Society*, vol. 84, 3837–3839, Oct. 1962.

H. Schroeder et al.: The Structure of Neocarborane, *Inorganic Chemistry*, vol. 2, No. 6, 1317–1319, Dec. 1963.

S.A. Tsyganov et al.: Mechanisms of Carborane 1,6–$C_2B_4H_6$ High–Temperature Oxidation in Water Vapor, *Zel'Dovich Memorial*, 83–86, 12–17 Sep. 1994.

V.G. Slutsky et al.: On the Combustion of 1,6–Dicarba–closo–hexaborane, 12–14, *Mendeleev Commun.*, 1994.

V.G. Slutsky et al.: Dynamic Chemical Processes of Detonations: Underwater Explosion and Combustion Processes with the Use of Water as an Oxidant, *Mat. Res. Soc. Symp. Proc.*, vol. 418, 407–412, 1996.

G.L. Gal'chenko et al.: Determination of the Enthalpies of Formation of the Lower closo–Carbaboranes 1,6–Dicarba–closo–hexaborane (6) and 2,4–Dicarba–closo–heptaborane (7), *Russian Journal of Physical Chemistry*, 59 (11), 1610–1613, 1985.

V.G. Slutsky et al.: Ignition of Carborane–4 in Oxygen–Containing Media, *Chem. Phys. Reports*, vol. 15(4) 615–621, 1996.

CARBORANE-CONTAINING AIRBAG INFLATOR

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings, a new type of inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices typically utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements such as may relate to one or more performance feature or characteristic such as the safety, simplicity, effectiveness, economy and reliability of the inflation apparatus and associated techniques used for inflating an inflatable device such as an airbag cushion.

While some potential problems or disadvantages may be associated with the inclusion of large quantities of water (perhaps up to or more than about 75% by volume) in airbag inflation fluids or if and when such inflation fluids contain water at too high a temperature, it is clear that inflation fluids such as used for safety restraint airbags can contain or include water. As will be appreciated and as further detailed below, numerous additional or possible advantages and benefits may be associated with the potential use of water-reactive compounds for gas generation. For example, in such uses, water may provide a relatively low cost reactant. In addition, water, as compared to typical gases, is of relatively high density and thus a comparatively large amount of water can be stored in a given storage volume. Further, water is a relatively low molecular weight material which may provide or result in comparatively large molar or volumetric quantities of reaction products.

While various water-reactive compounds are available, the more widespread incorporation of water-reactive compounds in airbag gas generating formulations has generally been restricted by factors such as those relating to safe and effective manufacture and use. For example, alkali metals (i.e., lithium, sodium, potassium, cesium, rubidium and francium) are generally among the most chemically reactive of all the metals. In pure forms, such alkali metals are generally so water-reactive that they would normally have to be stored completely separated from the water, such as to avoid undesired or premature reaction. As will be appreciated, the need for such separate storage and containment may undesirably increase manufacturing and production complexity, increase cost and concomitantly reduce performance and operation reliability.

Other metals (such as magnesium, zirconium, titanium and zinc, for example) are also reactive with water. While these metals or various forms thereof are commonly added to or known for inclusion in various pyrotechnic formulations such as used in gas generation for airbag cushions, the reactivity of these metals is generally dependent on factors such as relating to particle size and distribution, purity, content of any absorbed gases and surface characteristics.

Compounds of hydrogen and one or more nonmetals are commonly called or referred to as molecular hydrides. The molecular hydrides of boron are water-reactive and are generally called boranes. There are numerous known borane species. The formula for boron hydrides commonly range from the boron anions, $B^nH_n^{2-}$ (where n=6–12) to species such as $B_nH_{n+4}$ and $B_nH_{n+6}$. While the details of the chemical nature of boranes are generally beyond the scope of this description, borane molecules have generally been described as "closed-cage," typically polyhedral, and "open-cage" structures.

Due to the high energy (e.g., high heat of combustion) content characteristically associated with boron hydrides, such materials have been deemed as potential high-energy rocket or jet fuels. Boranes, however, posses many properties or characteristics that may render them unsuitable for common inflatable restraint airbag applications. For example, borane compounds are often susceptible to one or more of the following shortcomings or drawbacks: high toxicity, pyrophoricity (e.g., subject to spontaneous ignition when exposed to air), thermal instability at room temperature and subject to violent reactivity with water.

Thus, there remains a need and a demand for an inflator device such as may permit the low pressure, perhaps atmospheric pressure, storage of reactants or gas generating materials in combination with at least some of the desirable features of the above-referenced fluid fuel inflators. In particular, there exists a need and demand for an inflator device which desirably may facilitate or otherwise more easily permit the advantageous use of such water-reactive compounds which avoid or minimize one or more of the shortcoming or limitations relating to the prior use of water-reactive compounds for such inflation applications.

SUMMARY OF THE INVENTION

A general object of the invention is to provide improved apparatus and methods for inflating an inflatable device such as an inflatable vehicle occupant restraint for use in inflatable restraint systems.

A more specific objective of the invention is to overcome one or more of the problems described above.

The general object of the invention can be attained, at least in part, through a specified combination for use in inflation of an inflatable device. In accordance with one embodiment of the invention, such a combination includes a closed storage volume which contains a quantity of at least one carborane fuel material and a quantity of at least one primary oxidant. The combination also includes an initiator for initiating combustion of at least a portion of the quantity of the carborane fuel material and at least a portion of the quantity of the primary oxidant. Such combustion forms first combustion products including heat and a quantity of a first product fuel species and results in the opening of storage volume whereby at least a portion of the first combustion products are released thereof for inflation of the inflatable device.

The prior art fails to provide apparatus and methods for inflating an inflatable device which provide as great as may be desired safety, simplicity, effectiveness, economy and reliability or which are as small or as light of weight as may be desired. In particular, the prior art fails to provide apparatus and methods for inflating an inflatable device which may be conducive or more readily permit the low pressure, perhaps atmospheric pressure, storage of reactants or gas generating materials in combination with at least some of the desirable features of the above-referenced fluid fuel inflators.

The invention further comprehends an apparatus for inflating an inflatable device. In accordance with one embodiment of the invention, such an apparatus includes a closed storage volume which contains a quantity of at least one carborane fuel material, a quantity of water and a quantity of at least one decomposable oxidant source material. The apparatus also includes an initiator. The initiator functions to initiate combustion of at least a portion of the quantity of the carborane fuel material and at least a portion of the quantity of water to form first combustion products including heat and a quantity of a first product fuel species. The initiator also functions to initiate decomposition of the decomposable oxidant source material to form an oxidant to react with at least a portion of the first product fuel species to form additional gaseous combustion products. In the apparatus, the closed storage volume is adapted to open when a predetermined increase in pressure therewithin is realized whereby at least a portion of the inflation gas, e.g., gaseous combustion products, is released from said storage volume to inflate the inflatable device.

The invention still further comprehends a method for inflating an inflatable device using an inflation apparatus. In accordance with one embodiment of the invention, such a method include the step of initiating combustion, within the apparatus, of at least a portion of a quantity of at least one carborane fuel material and at least a portion of a quantity of at least one primary oxidant to form first combustion products including heat and a quantity of a first product fuel species. At least a portion of the first combustion products are subsequently released from the apparatus to inflate the inflatable device.

As used herein, references to a "carborane," "carborane fuel," or the like are to be understood to refer to organoboron (or organometallic boron) compounds characterized by a cage structure. More specifically, carboranes can generally be described as materials having a boron cage system in which one or more carbon atoms is present in the boron framework. Such molecular cage structures can take various forms. For example, some carboranes take the form of closed-caged polyhedral structures. Oftentimes, however, the caged structure may be likened to a polyhedral structure in which one or more of the vertices is missing. Such different resulting structures and molecular features are generally classified by rather specific naming conventions. The details and specifics of such naming conventions and resulting names are known or ascertainable by those skilled in the art and are generally beyond the scope of the subject description.

Classically, a chemical formula of $C_2B_{n-2}H_n$ (where $3 \leq n < 10$) has been suggested for the carborane family. A broader and more complete description of carboranes as a member of the three main classes $C_{0-2}B_nH_{n+2}$, $C_{0-4}B_nH_{n+4}$ and $C_{0-6}B_nH_{n+6}$ (where n equals at least 1 and can range up to 10 or more) has also been suggested. Some of these compounds have been synthesized while others have been postulated. In addition, numerous derivatives of such "parent" carborane materials have been synthesized, manufactured or otherwise produced such as through the alkylation, halogenation and nitration of such more fundamental carborane materials. Thus, these derivative species feature atoms other than boron and carbon as a part of the fundamental cage structure. Possible attached chemical groups and elements include but are not limited to: hydrocarbons, alcohols, ethers, amines, ketones, nitrogen, silicon, haloalkyl, halogen, phosphorous, sulfur, lead, antimony, germanium, tin, cesium and various transition metal-containing groups, for example. The synthesis of different carborane-based molecules continues to be an extremely active field of research and it is reasonable to anticipate that many yet unknown carborane materials will be identified in the future.

Thus, the term "carboranes," as used herein in its broad application, is to be understood to generally refer to such carborane materials and such derivatives thereof.

It is to be appreciated, however, that carboranes as so defined are generally distinct from alkylboranes—which can be simply viewed as boranes to which a carbon-containing ligand has been attached.

Other objects and advantages will be apparent to those skilled in the art from the following detailed description taken in conjunction with the appended claims and drawings.

DETAILED DESCRIPTION OF THE INVENTION

Figure 1:
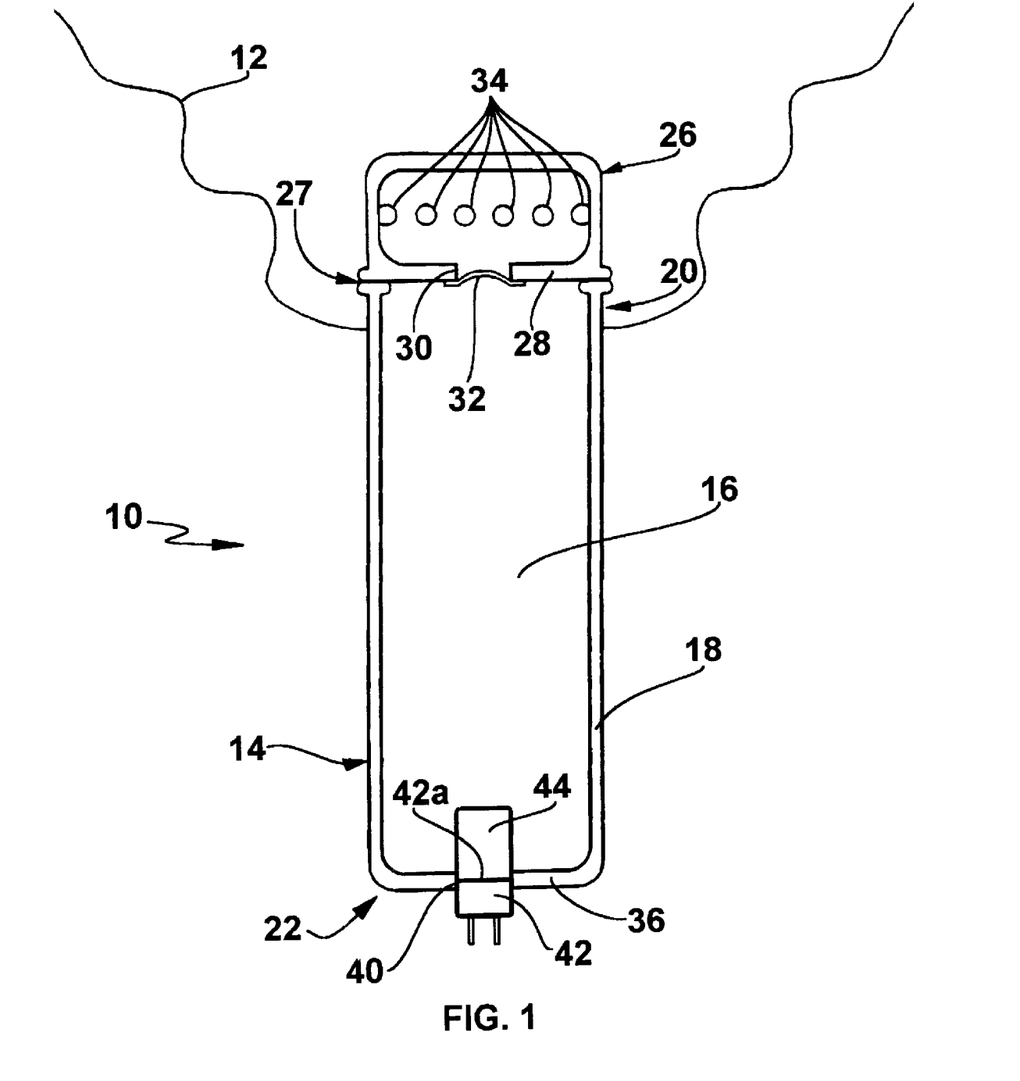
FIG. 1 is a simplified, partially in section, schematic drawing of a vehicle occupant safety assembly in accordance with one embodiment of the invention.

The present invention may be embodied in a variety of different structures. As representative, FIG. 1 illustrates the present invention as embodied in a vehicle occupant safety assembly, generally designated by the reference numeral 10. The vehicle occupant safety assembly 10 includes an inflatable vehicle occupant restraint 12, e.g., an inflatable airbag cushion, and an apparatus, generally designated by the reference numeral 14, for inflating the occupant restraint. Such an apparatus is commonly referred to as an inflator.

While the invention is described hereinafter with particular reference to an inflator for an airbag assembly such as for use in various automotive vehicles including vans, pick-up trucks, and particularly automobiles, it is to be understood that the invention also has applicability not only with various types or kinds of airbag module assemblies for automotive vehicles including driver side, passenger side, side impact, curtain and carpet airbag assemblies, for example, but also with other types of vehicles including, for example, airplanes, as well as possibly other inflation applications.

Returning to FIG. 1, upon proper actuation of the vehicle safety assembly 10, the vehicle occupant restraint 12 is inflated by a flow of an inflation fluid, e.g., gas, from the inflator 14 to restrain movement of an occupant of the vehicle. The inflatable vehicle occupant restraint 12 is inflated into a location within the vehicle between the occupant and certain parts of the vehicle interior, such as the doors, steering wheel, instrument panel or the like, so that the occupant does not forcibly strike such parts of the vehicle interior.

The inflator assembly 14 generates inflation gas via the reaction of reactant materials contained therewithin. As will be described in greater detail below, such reaction may desirably involve reactant materials including a carborane fuel material, such as described above, and an oxidant, with such fuel and oxidant reaction taking the form of a combustion reaction.

The inflator assembly 14 comprises a chamber 16 that, as described in greater detail below, contains one or more supplemental oxidant material and is sometimes referred to herein as a "combustion chamber." The chamber 16 is defined by an elongated generally cylindrical sleeve 18. The sleeve may include a fill port (not shown), as is known in the art, wherethrough materials such as desired supplemental oxidants, can be passed into the chamber 16. After the chamber 16 has been filled, such a fill port can be appropriately blocked or plugged, as is known, such as by a pin or ball.

The sleeve 18 has a first end 20 and a second end 22. The first end 20 is closed by a diffuser assembly 26 joined or attached thereto in an appropriate manner, such as by an inertial weld 27. The diffuser assembly 26 includes a rupturable base wall 28. In the illustrated embodiment, the rupturable base wall 28 includes an opening 30 normally closed by means of a burst disc 32 or the like. It will be appreciated that other forms of a rupturable wall such as a wall having an appropriately scored surface or thinned region, for example, can, if desired, be used. The diffuser assembly 26 also includes a plurality of openings 34, wherethrough the inflation gas from the inflator assembly 14 is properly dispensed into the occupant restraint 12. Thus, the diffuser assembly 26 can serve to facilitate direction of the inflation fluid from the inflator assembly 14 into the associated inflatable vehicle occupant restraint 12.

The sleeve second end 22 is partially closed by a base wall 36 which includes an opening 40 therein, wherethrough an initiator device 42 is attached in sealing relation, such as with a weld, crimp or other suitable seal, within the combustion chamber 16.

In such an assembly, the initiator device can include any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation of the desired post-initiation combustion reactions. In view thereof, as pyrotechnic charge-containing initiators can typically more easily produce such relatively large heat inputs from a relatively small sized initiator device, the practice of the invention with such initiators can be particularly advantageous. An initiator may provide such a large heat input through the inclusion therewith or therein of an additional quantity of pyrotechnic, i.e., a "booster charge," such as boron potassium nitrate ($BKNO_3$), for example.

The inflator assembly 14 further includes a closed storage volume 44 generally adjacent a discharge end 42a of the initiator device 42 with the storage volume 44 in reaction initiation communication with the initiator device 42. The contents of the storage volume 44 generally include a quantity of at least one carborane fuel material and a quantity of at least one primary oxidant. As will be appreciated, close proximity of the storage volume 44 to the associated initiator device 42, preferably adjacent the initiator device discharge end 42a, generally facilitates and helps ensure proper and desired ignition upon actuation of the initiator device.

As described and defined above, such a carborane fuel material generally refers to an organoboron (or organometallic boron) compound characterized by a cage structure and various derivatives thereof. Carboranes are generally an extremely high-energy fuel material, which are combustible with oxidant materials such as oxygen, nitrous oxide and water when properly initiated and further are non-toxic. Further, the chemical nature of many forms or types of carborane materials renders such carborane materials generally extremely thermally stable thus permitting storage at ambient temperatures and for the extended durations commonly associated with automotive airbag inflatable restraint installations.

While various oxidant materials are useable as the primary oxidant, a preferred practice of the invention utilizes water as a primary oxidant material in combination with such carborane fuel material. The specific combination of carborane fuel and primary oxidant are desirably selected to facilitate effective and efficient operation while simplifying or at least minimizing burdens relating to manufacture, production and use (particularly the long term use demands imposed on vehicular safety restraint installations).

Subject inflator devices, such as through the avoidance of the need to separately store or contain the fuel from the primary oxidant, generally result or provide simplified inflator device design, manufacture and operation. For example and more specifically, such corresponding inflator devices need not include such components as would normally be required for such separate storage or containment of reactants. As will be appreciated, a design with fewer components generally results in greater or increased reliability.

In such assemblies, it will generally be preferred that such a fuel oxidant mixture be contained within the storage volume 44 and held separate from any pyrotechnic-containing initiator device in an appropriate hermetic manner such as to avoid the potential problem of degradation of the pyrotechnic material when contacted with water. Such separation can commonly be achieved by means of welding a thin metal barrier, such as a burst disc, between the pyrotechnic-containing volume of the initiator device, such as at the discharge end 42a thereof, and the fuel and oxidant-containing storage volume 44.

Upon initiation and as described in greater detail below, such carborane fuel and primary oxidant react to produce primary products of combustion (sometimes referred to herein as "first combustion products"). Such first combustion products typically include heat and a quantity of a first product fuel species such as hydrogen, one or more hydrocarbon species (such as methane, butane, etc.) or one or more combinations thereof.

As identified above, the combustion chamber 16 typically contains one or more supplemental oxidant material. Such supplemental oxidant material may, upon contact with the first combustion products, desirably react to form inflation gas, including second combustion products and which inflation gas may subsequently be passed or otherwise conveyed to the inflatable device 12.

A wide variety of supplemental oxidant materials can, if desired, be used in the practice of the invention. Possible supplemental oxidant materials for use in the practice of the invention include: air, oxygen, nitrous oxide, carbon dioxide and mixtures thereof, for example.

Such supplemental oxidant materials can be stored or contained within the combustion chamber 16 in various selected forms. For example, such supplemental oxidant materials can be stored in a gaseous, liquid or multi-phase form (i.e., partially gaseous and partially liquid mixture), as may be desired. The common premium in modem vehicle design placed on minimizing the size requirements for vehicular components such as inflatable restraint systems generally results in a preference for smaller sized airbag inflators. In view thereof and the generally greater density of such oxidant materials when in a liquid rather than a gaseous form, one preferred embodiment of the invention involves storage of such an oxidant material, e.g., nitrous oxide, carbon dioxide, etc., in a liquid or multi-phase form.

Such supplemental oxidants stored under relatively high pressure (e.g., pressures of 500 psi (3.5 MPa) or more) generally permit such a combustion chamber 16 to contain sufficient supplemental oxidant, such as may be desired, for subsequent reaction with the above-identified first combustion products and thereby minimize and preferably avoid passage of any significant quantity of first product fuel species into the associated airbag cushion.

It will be understood, however, that the broader practice of the invention is not limited to use of supplemental oxidants stored under such high pressures or in liquid form. For example, a low pressure gaseous form of supplemental oxidant can, if desired, be stored within the combustion chamber 16.

It will be appreciated, that the combustion chamber may, if desired, also contain materials or components in addition to the supplemental oxidant, such as described above. In some applications, it may be desirable that the combustion chamber also contain one or more inert gaseous materials. For example, an inert gas such as helium can be included with the supplemental oxidant to facilitate leak checking of the inflator apparatus or, more specifically, of the combustion chamber thereof. Alternatively or in addition, an inert gas, such as argon or helium, for example, or mixture of such inert gases, can be included with the supplemental oxidant such as to effectively lower the concentration of oxidant within the combustion chamber. The lowering of the combustion chamber oxidant concentration can help moderate and control the rate of the combustion process which occurs therewithin without requiring alteration of the physical dimensions of the combustion chamber. As a result, a particular inflator assembly design can more easily be adapted to the specific inflation requirements of a greater variety of inflation applications and thus reduce, minimize or simplify inventory requirements as well as minimize or simplify equipment and tooling changes associated with changes or shifts between the manufacture, production and assembly of particular assemblies. The inclusion of such inert gas may also serve to supplement the gas produced or formed upon reaction within the inflator assembly.

Further, additionally or alternatively and as disclosed in commonly assigned, pending patent application U.S. Ser. No. 08/935,016, filed on Sep. 22, 1997, the combustion chamber 16 may include a quantity of at least one radioactive isotope leak trace material whereby fluid leakage from the chamber can be detected, as disclosed in that prior patent application.

In operation, such as upon the sensing of a collision, an electrical signal is sent to the initiator device 42. The initiator device 42 functions and, when it is a pyrotechnic-containing initiator, discharges high temperature products of combustion into the storage volume 44 and the contents thereof, which in a preferred embodiment includes a quantity of at least one carborane fuel material and a quantity of liquid water. The energy content of the initiator can be desirably chosen such that the heat from the combustion products is sufficient to vaporize and begin decomposition of the carborane and water mixture. Subsequently, the fuel and oxidant mixture burns to produce primary products of combustion, i.e., "first combustion products." Such first combustion products typically include heat and a quantity of a first product fuel species such as hydrogen, one or more hydrocarbon species (such as methane, butane, etc.) or one or more combinations thereof. The ratio of carborane fuel relative to water oxidant is generally desirably controlled such that the reaction takes place at near stoichiometric or slightly fuel-lean conditions.

Near stoichiometric to slightly fuel-lean operation is believed generally advantageous for a number of reasons. First, near stoichiometric or fuel-lean operating conditions generally help ensure more complete combustion of the carborane fuel material. Thus, minimizing and avoiding waste of a possibly relatively costly reactant. Second, at stoichiometric conditions, the temperature of the first combustion products will generally be maximized, thus aiding in the subsequent ignition and combustion thereof with the supplemental oxidant material stored within the inflator device. Expressed in terms of equivalence ratio (defined as the actual fuel-to-oxidant ratio divided by the stoichiometric fuel-to-oxidant ratio), the reactants are generally present in an equivalence ratio of about 0.4 to about 1.2, preferably in an equivalence ratio of about 0.6 to about 1.1 and, more preferably, in an equivalence ratio of about 0.8 to about 1.0.

The storage volume 44 can desirably be filled such that a mixture of carborane and water vapor, rather than a liquid mixture, occupies a selected, small portion or percentage of the available storage volume. For example, in accordance with certain preferred embodiments of the invention, such vapor generally desirably occupies 0 to about 15%, preferably about 2 to about 10% of the available storage volume. As more fully described in commonly assigned and herein incorporated Rink, U.S. Pat. No. 5,494,312, issued Feb. 27, 1996, the inclusion of such a vapor containing volume can permit or allow for expansion of the contained liquid phase over a desired temperature range, such as the ambient temperature range at which the device is designed to function.

With the discharge of the initiator device 42 into the storage volume 44 and the opening thereof, first combustion products formed by the reaction of the contents of the storage volume 44 are discharged into the combustion chamber 16. As a result, at least a portion of the first combustion products released from the storage volume 44 contacts at least a portion of the quantity of the supplemental oxidant such that the first combustion product fuel material ignites and begins to burn. As this fuel material burns, the pressure and temperature within the combustion chamber 16 rises.

When the pressure within the combustion chamber 16 exceeds the structural capability of the burst disc 32, the disc ruptures or otherwise permits the passage of the inflation gas into the diffuser assembly 26 and subsequently through the openings 34 therein into the associated airbag cushion 12.

It is to be understood that carborane materials useable in the practice of the invention are available in gaseous and liquid forms. In practice, the use of liquid form carborane materials is generally preferred as such use may facilitate storage or containment of the carborane material with liquid water in a small, well-controlled volume. It is to be appreciated, however, that an airbag inflator in accordance with the invention may operate using a gaseous carborane fuel material. In such an inflator, a gaseous carborane fuel material, a primary oxidant such as composed of liquid water, a supplemental oxidant material such as described above and, if desired or required, one or more inert gaseous materials, as also described above, may be contained in contact within a closed storage volume of the corresponding inflator device.

In such an inflator device, an initiator would fire into the storage volume such as to heat the carborane/water/supplemental oxidant/inert gas (if included) contents. Given sufficient heat input from the initiator, the water would vaporize and ignite the carborane fuel material. The combustion products generated by this reaction would, in turn, burn in the gaseous oxygen-containing environment within the device.

Figure 2:
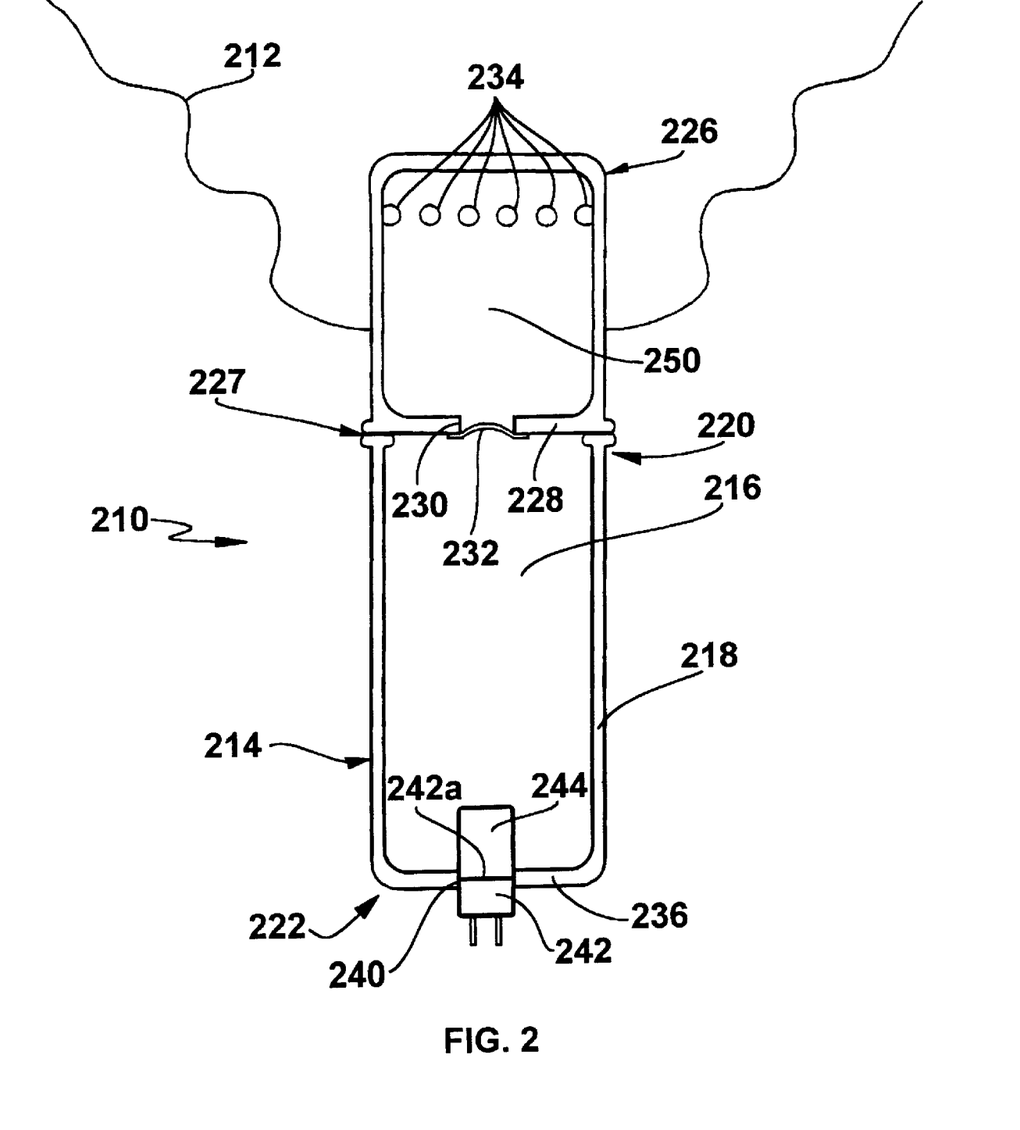
FIG. 2 is a simplified, partially in section, schematic drawing of a vehicle occupant safety assembly in accordance with an alternative embodiment of the invention.

FIG. 2 illustrates a vehicle occupant safety assembly 210 in accordance with an alternative embodiment of the invention. The vehicle occupant safety assembly 210 is generally similar to the vehicle occupant safety assembly 10 illustrated in FIG. 1 and described above. The vehicle occupant safety assembly 210, similar to the assembly 10 includes an inflatable vehicle occupant restraint 212, e.g., an inflatable airbag cushion, and an airbag inflator 214.

The inflator assembly 214 comprises a combustion chamber 216 that contains one or more oxidant materials. The combustion chamber 216 is defined by an elongated generally cylindrical sleeve 218 having a first end 220 and a second end 222. The first end 220 is closed by a diffuser assembly 226 joined or attached thereto in an appropriate manner, such as by an inertial weld 227.

The diffuser assembly 226, like the diffuser assembly 26 described above, includes a rupturable base wall 228 wherein an opening 230 normally closed by means of a burst disc 232 or the like and a plurality of openings 234, wherethrough the inflation gas from the inflator assembly 214 is properly dispensed into the associated occupant restraint 212.

The diffuser assembly 226, however, provides an enlarged internal volume, forming a chamber 250, sometimes subsequently referred to herein as a "secondary combustion chamber." The inclusion of such a secondary combustion chamber 250 may be desired or required such as to provide additional residence time within the inflator assembly prior to passage of the products therefrom to the associated airbag cushion. As will be appreciated, such additional residence time may more easily permit or help assure the more complete reaction of the supplemental oxidant material with the first combustion products to form the desired inflation gas and which inflation gas may subsequently be passed or otherwise conveyed to the airbag cushion 212. Thus, the inclusion of such a secondary combustion chamber 250 can better assure that the materials conveyed to the associated airbag cushion are normally not undesirably reactive.

The sleeve second end 222 is partially closed by a base wall 236 which includes an opening 240 therein, wherethrough an initiator device 242, such as a pyrotechnic charge-containing initiator, is attached in sealing relation, such as with a weld, crimp or other suitable seal, within the combustion chamber 216.

The inflator assembly 214 further includes a closed storage volume 244 generally adjacent a discharge end 242a of the initiator device 242, with the storage volume 244 in reaction initiation communication with the initiator device 242. The storage volume 244, like the storage volume 44 described above, contains a quantity of at least one carborane fuel material and a quantity of at least one primary oxidant, e.g., water.

The operation of the inflator assembly 210 is generally similar to that described above relative to the inflator assembly 10. For example, such as upon the sensing of a collision, an electrical signal is sent to the initiator device 242. The initiator device 242 functions and, when it is a pyrotechnic initiator, discharges high temperature products of combustion into the storage volume 244 and the contents thereof, which in a preferred embodiment includes a quantity of at least one carborane fuel material and a quantity of water. The fuel and oxidant mixture burns to produce primary products of combustion or first combustion products. Such first combustion products typically include heat and a quantity of a first product fuel species such as hydrogen, a hydrocarbon species or a combination thereof.

With the discharge of the initiator device 242 into the storage volume 244 and the opening thereof, first combustion products formed by the reaction of the contents of the storage volume 244 are discharged into the combustion chamber 216. As a result, at least a portion of the first combustion products released from the storage volume 244 contacts at least a portion of the quantity of the supplemental oxidant such that the first combustion product fuel material ignites and begins to burn. As this fuel material burns, the pressure and temperature within the combustion chamber 216 rises.

When the pressure within the combustion chamber 216 exceeds the structural capability of the burst disc 232, the disc ruptures or otherwise permits the passage of the inflation gas into the diffuser assembly 226. As described above, the secondary combustion chamber 250 formed by the diffuser assembly 226 can desirably provide additional residence time within the inflator assembly 214 prior to passage therefrom to the associated airbag cushion 212. Such additional residence time can better ensure or permit the more complete reaction of the supplemental oxidant material with the first combustion products while such reactant materials are contained within the inflator assembly 214 and prior to passage into the associated airbag cushion 212.

Subsequently, the inflation gas is conveyed through the diffuser openings 234 into the associated airbag cushion 212.

While the invention has been described above relative to embodiments wherein the carborane fuel and primary oxidant are stored together within a closed storage volume, in close proximity to the associated initiator device, preferably adjacent the discharge end of the initiator device, and sealed from the supply of supplemental oxidant material contained within the combustion chamber, the invention is not necessarily so limited. For example, in certain preferred embodiments of the invention, the carborane fuel and primary oxidant are desirably stored in intimate contact with an oxidant source material.

Figure 3:
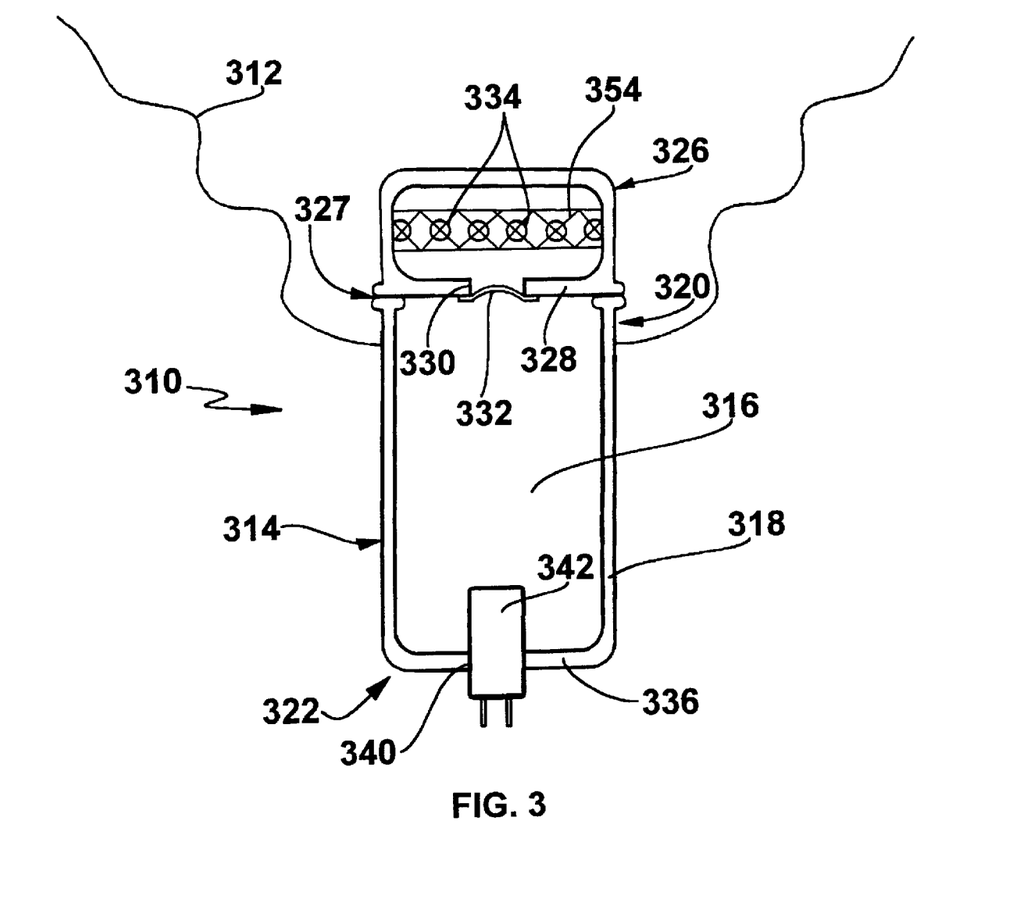
FIG. 3 is a simplified, partially in section, schematic drawing of a vehicle occupant safety assembly in accordance with another alternative embodiment of the invention.

Turning to FIG. 3, there is illustrated a vehicle occupant safety assembly, generally designated 310, in accordance with one such alternative preferred embodiment of the invention. The vehicle occupant safety assembly 310, similar to the assembly 10, described above, includes an inflatable vehicle occupant restraint 312, e.g., an inflatable airbag cushion, and an airbag inflator 314.

The inflator assembly 314 forms a closed storage volume or chamber 316 and is defined by an elongated generally cylindrical sleeve 318. The sleeve may include a fill port (not shown), as is known in the art, wherethrough materials can be passed into the storage volume 316. After the storage volume 316 has been filled, such a fill port can be appropriately blocked or plugged, as is known, such as by a pin or ball.

The sleeve 318 has a first end 320 and a second end 322. The first end 320 is closed by a diffuser assembly 326, generally similar to the diffuser assembly 26 shown in FIG. 1 and described above. The diffuser assembly 326 is joined or attached to the sleeve first end 320 in an appropriate manner, such as by an inertial weld 327. The diffuser assembly 326 includes a rupturable base wall 328. In the illustrated embodiment, the rupturable base wall 328 includes an opening 330 normally closed by means of a burst disc 332 or the like. As with the above-described embodiments, other forms of a rupturable wall such as a wall having an appropriately scored surface or thinned region, for example, can, if desired, be used. The diffuser assembly 326 also includes a plurality of openings 334, wherethrough the inflation gas from the inflator assembly 314 is properly dispensed into the associated occupant restraint 312.

If desired, an appropriate selected filter element 354, such as of a selected wire screen mesh, can be contained within the diffuser assembly 326. As shown, such a filter element can desirably be positioned adjacent to the diffuser openings 334 whereby the gaseous material, conveyed from the inflator assembly 314 to the interior of the airbag cushion 312, desirably passes through or in contact with the filter element 354. Thus, the inclusion of such a filter element can serve to filter, strain or otherwise remove or prevent passage of undesirable particulate materials into the airbag cushion and the corresponding vehicle occupant compartment.

Similar to the above-described embodiments, the sleeve second end 322 is partially closed by a base wall 336 which includes an opening 340 therein, wherethrough an initiator device 342 is attached in sealing relation within the storage volume 316.

The contents of the closed storage volume 316 generally include a quantity of at least one carborane fuel material and a quantity of at least one primary oxidant, such as similar to the closed storage volumes 44 and 244 in the above-described inflator assemblies 14 and 214, respectively. As in the above-described embodiments, such carborane fuel and primary oxidant react to produce primary products of combustion or first combustion products which typically include heat and a quantity of a first product fuel species such as hydrogen, a hydrocarbon species or a combination thereof The storage volume 316 additionally contains a quantity of an oxidant source material. As further disclosed below, upon thermal initiation contact with the first combustion products and excess heat resulting from the initiator device 342, such an oxidant source material desirably reacts to form a secondary oxidant. Upon combustion reaction contact with the first combustion product fuel species, such secondary oxidant desirably reacts to form additional gaseous products released thereof for inflation of the associated airbag cushion.

A wide variety of materials are available which, upon being heated, produce, form or otherwise generate a secondary oxidant such as reacts, e.g., burns, with a fuel produced upon reaction of the carborane fuel and primary oxidant. As described more fully below, ammonium nitrate ($NH_4NO_3$) is a particularly preferred oxidant source material for use in the practice of the invention.

At sufficiently high temperatures, e.g., at temperatures of greater than about 215° C., ammonium nitrate generally decomposes into nitrous oxide and water according to the following reaction:

$$NH_4NO_3(s) = N_2O(g) + 2H_2O(g) \quad (1)$$

Further, at even higher temperatures, e.g., at temperatures of greater than about 560° C., nitrous oxide will dissociate into nitrogen and oxygen. Thus, resulting in the following overall reaction:

$$2NH_4NO_3(s) = 2N_2(g) + 4H_2O(g) + O_2(g) \quad (2)$$

Consequently, such reactions of ammonium nitrate generally result in relatively high molar yields of products compared to reactants, with reaction (1) yielding 3 moles of products per mole of reactant and reaction (2) yielding 3.5 moles of products per mole of reactant. As the volume of gas produced or generated by an inflator is a significant factor in the performance thereof, a high molar ratio of products to reactants is a desirable for an airbag inflator device.

Ammonium nitrate advantageously is at least partially soluble in water. Thus, at least a portion of the quantity of ammonium nitrate can be held in solution with the water that acts as the primary oxidant for the carborane fuel. Such solubility may have important performance ramifications as materials that separate during storage have often been found to be a major source of performance variability in corresponding inflator devices. In addition, such solubility may permit or facilitate the application of bulk loading techniques for the corresponding inflator devices as individual component may not need to be separately loaded into the inflators.

Ammonium nitrate has long been identified as a potential constituent for solid pyrotechnic gas generant materials. As described above, ammonium nitrate reacts to produce a high molar output. Ammonium nitrate, however, is also known to typically undergo changes in crystalline structure over the normally expected or anticipated range of storage conditions, e.g., temperatures of about −40° C. to about 110° C. These changes in structure typically involve expansion and contraction of the solid material. Such changes, even when relatively minute, can strongly influence the physical properties of a corresponding gas generant material and, in turn, strongly affect the burn rate of the generant material. Unless checked, the performance variations typically associated with such changes are generally unacceptable for typical inflatable restraint system applications.

In the subject inflator device, ammonium nitrate (and other desirable oxidant source materials) produce, liberate or otherwise form a secondary oxidant through decomposition of the oxidant source material. A significant benefit to such operation is that the rate of decomposition of these oxidant source materials, and thus the rate of liberation or formation of the secondary oxidant, is believed to be largely independent (or at least significantly less dependent) of changes in the structure of oxidant source materials. Thus, for a subject inflator device utilizing ammonium nitrate as an oxidant source material, although the crystalline structure of the ammonium nitrate might slightly change with temperature, the ammonium nitrate will still liberate secondary oxidant in about the same quantity and at about the same rate. This is particularly the case for any ammonium nitrate that is held in solution with the water, as such ammonium nitrate is generally devoid of any particular crystal structure.

In addition, the storage volume 316 may, if desired, contain additional materials that produce additional quantities of oxidant upon thermal initiation contact with the first combustion products and excess heat from the initiator. Such materials would preferably produce additional oxygen to oxidize any excess hydrogen or hydrocarbons produced from ammonium nitrate decomposition and reaction of the carborane fuel and primary oxidant. Possible additional oxidant source materials include, but are not limited to, metallic chlorates, perchlorates, chlorites, hypochlorites and mixtures thereof. For example, sodium chlorate ($NaClO_3$) upon being heated to its melting point (about 250° C.) decomposes to form sodium perchlorate ($NaClO_4$) and sodium chloride (NaCl, ordinary table salt):

$$4NaClO_3(s) = 3NaClO_4(s) + NaCl(s) \quad (3)$$

Upon further heating (to a temperature of about 480° C.) sodium perchlorate will decompose into sodium chloride and oxygen:

$$NaClO_4(s) = NaCl(s) + 2O_2(g) \quad (4)$$

As will be appreciated, the oxygen produced by the above reaction will readily oxidize available hydrogen. Any remaining salt can be removed from the exhaust products by various techniques such as through the filtering or plating of such salt material on internal surfaces of the inflator.

It will be appreciated that many other materials that decompose to form an oxidant are available and could be used in the inventive devices. Examples of such other materials include sodium persulfate ($Na_2O_8S_2$), calcium hypochlorate $Ca(ClO)_2$, and lithium tetraborate ($Li_2B_4O_7$), for example. Thus, the broader practice of subject development is not necessarily limited to the specific example compounds identified above.

As a result, reaction between the carborane fuel and the primary oxidant is initiated, producing first combustion products including heat and a quantity of a first combustion product fuel species, e.g., hydrogen, hydrocarbons (typically methane and butane), or combinations thereof. For clarity, two different reactions, each involving a different carborane species, the first being a gaseous phase carborane species and the second being a liquid phase carborane species, are presented.

The reaction of gaseous phase dicarba-closo-hexaborane ($C_2B_4H_6$) with water can be represented as:

$$C_2B_4H_6(g) + 6H_2O(l) = 2B_2O_3(l) + 5H_2(g) + 2CH_4(g) \quad (5)$$

In the above reaction, boron oxide is present as a product.

Alternatively, the reaction can be represented with boric acid (a weak acid) as a product, as shown below:

$$C_2B_4H_6(g) + 12H_2O(l) = 4H_3BO_3(l) + 5H_2(g) + 2CH_4(g) \quad (6)$$

Both reactions (5) and (6) are seen to produce the desired hydrogen and hydrocarbon products. However, the stoichiometry in each of these reactions is different, depending on the chemical nature of the assumed boron-containing product. In practice, boron oxide would be expected to be a preferred boron-containing product as boron oxide generally easier to remove from the exhaust, such as through filtering or plating.

The reaction of a non-toxic, liquid-phase carborane represents a preferred embodiment of the invention. One such carborane reported in the literature is termed propylcarborane and is represented by the formula $C_2B_{10}H_{11}$—$C_3H_7$. The reaction of propylcarborane with water can be expressed as follows:

$$C_2B_{10}H_{11}—C_3H_7(l) + 15H_2O(l) = 5B_2O_3(l) + 17H_2(g) + CH_4(g) + C_4H_{10}(g) \quad (7)$$

In addition, the storage volume 316 may, if desired, additionally contain additional materials or additives. For example, in accordance with certain preferred embodiments, it may be desirable that the storage volume 316 additionally contain a quantity of one or more antifreeze agents such as to permit or facilitate lower ambient temperature operation of the corresponding inflator device. For example, such an antifreeze agent additive may take the form of a glycol (e.g., ethylene glycol) or an alcohol (e.g., methanol).

The normal operation of the vehicle occupant safety assembly 310 is as follows:

Upon the sensing of a collision, an electrical signal is sent to the initiator device 342. The initiator device 342 functions and, when it is a pyrotechnic charge-containing initiator, discharges high temperature combustion products into the storage volume 316 and the contents thereof, e.g., carborane fuel, primary oxidant and oxidant source material.

As a result, reaction between the carborane fuel and the primary oxidant is initiated, producing first combustion products including heat and a quantity of a first combustion product fuel species, e.g., hydrogen, hydrocarbons or combinations thereof. In addition, the high temperature combustion products discharged from the initiator device as well as heat produced from the reaction of the carborane fuel with the primary oxidant serve to heat the ammonium nitrate oxidant source material, resulting in reaction such as generally along the following lines:

$$5H_2 + 2CH_4 + 13N_2O + 2H_2O = 2CO_2 + 11H_2O + 13N_2 \quad (8)$$

Various specific different chemical reactions other than that shown above by reaction (8) can be specified dependent on the specific chemical description or formulation of the particularly selected carborane fuel material. As will be appreciated, the reaction of different carborane materials (e.g., different carbon, boron and hydrogen compositions) with water can produce different hydrocarbon products as well as different ratios of hydrogen and hydrocarbon products.

When the pressure within the storage volume 316 exceeds the structural capability of the burst disc 332, the disc ruptures or otherwise permits the passage of the inflation gas into the diffuser assembly 326 and subsequently through the filter element 354 and the diffuser assembly openings 334 therein into the associated airbag cushion 312.

As will be appreciated, such an inflator apparatus can yield or result in various desirable benefits. For example, such an inflator assembly contains or stores the carborane fuel, the primary oxidant and the oxidant source material in a single storage volume or chamber. Thus, the invention provides an inflator assembly having a relatively simple design and improved economics.

Further, such an inflator design can eliminate or avoid the need for the storage or containment of high pressure gases, as well as problems or complications associated therewith. For example, avoidance of high storage pressures can simplify the design and construction of the corresponding components of the inflator assembly as they are no longer required to be able to contain and hold such high pressure materials. As a result, assembly weight and cost can desirably be reduced. In addition, the leak rate from a device is generally controlled by or is a function of the internal pressure within the device. In view thereof, low pressure devices are commonly less susceptible to inadvertent leakages. Also, the leak check requirements for such a relatively low pressure chamber are typically desirably less severe.

In addition, properties of water such as density and molecular weight make the use of vaporized water as an inflation fluid especially attractive in terms of cost. In view thereof, it is significant to note that, if desired, an excess relative amount of water, i.e., an amount greater than that required to fully oxidize the carborane fuel, can be incorporated in the inflator designs of the subject invention.

It is to be appreciated that increased vaporized water content in the discharge from the subject inflator devices may desirably result in a higher mass and molar output from the inflator. In addition, the inclusion of an increased amount of water will generally permit or result in an increased amount of the ammonium nitrate to be held in solution. Alternatively, the inclusion of an increased amount of water may permit or facilitate the lower temperature solubilization of a given amount of ammonium nitrate.

As will be appreciated, vaporization of such excess water will generally require or necessitate a larger heat input. Various methods and techniques are available whereby such larger heat inputs can be created or formed. For example, such vaporization may be achieved by appropriately varying either or both the amount of the carborane fuel and primary oxidant and stoichiometry of the reaction therebetween. Alternatively or in addition, such a larger heat input can be achieved by increasing the heat output resulting from the associated initiator device. For example, for pyrotechnic charge-containing initiators, either or both increasing the load of the pyrotechnic charge and selectively varying or altering the pyrotechnic formulation contained therein can be used to increase the heat output resulting therefrom. In general, the simplest and preferred technique to provide desired increased heat input is to increase the pyrotechnic load of such a pyrotechnic charge-containing initiator.

Figure 4:
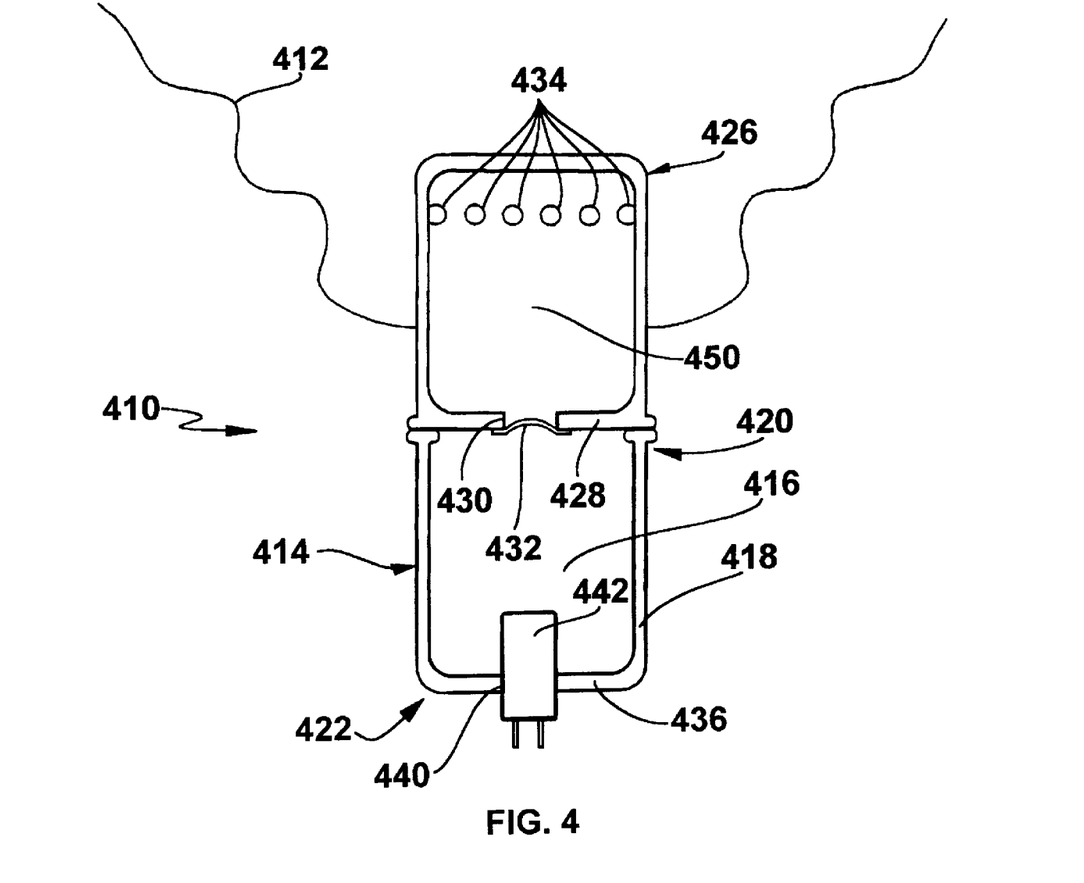
FIG. 4 is a simplified, partially in section, schematic drawing of a vehicle occupant safety assembly in accordance with still another alternative embodiment of the invention.

FIG. 4 illustrates a vehicle occupant safety assembly 410 in accordance with an alternative embodiment of the invention. The vehicle occupant safety assembly 410 is generally similar to the vehicle occupant safety assembly 310 illustrated in FIG. 3 and described above. The vehicle occupant safety assembly 410, similar to the assembly 310, described above, includes an inflatable vehicle occupant restraint 412, e.g., an inflatable airbag cushion, and an airbag inflator 414.

The inflator assembly 414 forms a closed storage volume or chamber 416 which is defined by an elongated generally cylindrical sleeve 418 having a first end 420 and a second end 422. The first end 420 is closed by a diffuser assembly 426 joined or attached thereto in an appropriate manner.

The diffuser assembly 426, like the diffuser assembly 326 described above, includes a rupturable base wall 428, with an opening 430 normally closed by means of a burst disc 432 or the like and a plurality of openings 434, wherethrough the inflation gas from the inflator assembly 414 is properly dispensed into the associated occupant restraint 412.

The diffuser assembly 426, however and similar to the diffuser assembly 226 shown in FIG. 2 and described above, provides an enlarged internal volume, forming a chamber 450, e.g., a "secondary combustion chamber." As described above, the inclusion of such a secondary combustion chamber may be desired or required such as to provide additional residence time within the inflator assembly prior to passage of the products therefrom to the associated airbag cushion. For example, the inclusion of such a secondary combustion chamber 450 can provide additional residence time for reactants within the inflator assembly and thus can more easily permit or help assure the more complete reaction of the reactants.

Similar to the above-described embodiments, the sleeve second end 422 is partially closed by a base wall 436 which includes an opening 440 therein, wherethrough an initiator device 442 is attached in sealing relation within the storage volume 416.

The normal operation of the vehicle occupant safety assembly 410 is as follows:

Upon the sensing of a collision, an electrical signal is sent to the initiator device 442. The initiator device 442 functions and, when it is a pyrotechnic charge-containing initiator, discharges high temperature combustion products into the storage volume 416 and the contents thereof, e.g., carborane fuel, primary oxidant and oxidant source material.

As a result, reaction between the carborane fuel and the primary oxidant is initiated, producing first combustion products including heat and a quantity of a first combustion product fuel species, e.g., hydrogen, hydrocarbons or combinations thereof, similar to the above-described assembly 310. Also similar to the above-described assembly 310, the high temperature combustion products discharged from the initiator device as well as heat produced from the reaction of the carborane fuel with the primary oxidant serve to heat the ammonium nitrate oxidant source material, resulting in reaction and the desirable production of gaseous species for the inflation of the associated inflatable device 412.

As with the above-described embodiments, when the pressure within the storage volume 416 exceeds the structural capability of the burst disc 432, the disc ruptures or otherwise permits the passage of the inflation gas into the diffuser assembly 426 and subsequently through the openings 434 therein into the associated airbag cushion 312.

As will be appreciated, such an inflator apparatus can yield or result in various desirable benefits. For example, such an inflator assembly contains or stores the carborane fuel, the primary oxidant and the oxidant source material in a single storage volume or chamber. Thus, the invention provides an inflator assembly having a relatively simple design and improved economics.

Though not shown, it will be appreciated that such an inflator assembly may, if desired, also include a filter element, similar to the inflator assembly 314, and such as may be desired to filter, strain or otherwise remove or prevent passage of undesirable particulate materials into the airbag cushion and the corresponding vehicle occupant compartment.

While the invention has been described above with respect to the use of a fill port or the like to permit the introduction of materials within the inflator assemblies of the invention, it is to be understood that the broader practice of the invention is not so limited. For example, if desired a fill technique such as disclosed in above-identified commonly assigned, pending patent application U.S. Ser. No. 08/935,016, may be employed. In accordance with such fill method, a cryogenically formed solid mass of a particle desired material is sealed within a chamber of the particular inflator apparatus without the use of a fill port. As a result, the corresponding inflator chamber need not include a fill port and a potentially troublesome leak path from the chamber is eliminated.

The subject inflator devices are generally applicable to various inflation systems. The present invention is described in further detail in connection with the following TABLES which are provided to illustrate the use of the subject inflator device to a typical driver side inflation system application. The loads and resulting ratios of the various identified materials identified in the TABLES are those that are currently deemed necessary or appropriate for proper operation of the device. These TABLES are provided to more fully illustrate the subject invention and the practice thereof. It is to be understood that these values are not necessarily to be construed as absolute values and that the broader practice of the invention is not limited to operation within these values.

TABLE 1

Inflator 14

| MATERIAL | LOAD (mg) General | Preferred |
| --- | --- | --- |
| initiator ignition charge - ZPP | 110–400 | 225–275 |
| initiator booster charge - $BKNO_3$ | 0–1000 | 0–500 |
| fuel - propylcarborane | 250–2500 | 500–1500 |
| primary oxidant - water | 300–9000 | 1600–2200 |
| combustion chamber contents - 20% $N_2O$, 70% Ar and 10% He | 35,000–60,000 | 40,000–50,000 |

TABLE 2

Inflator 314

| MATERIAL | LOAD (mg) General | Preferred |
| --- | --- | --- |
| initiator ignition charge - ZPP | 110–400 | 225–275 |
| initiator booster charge - $BKNO_3$ | 0–3000 | 1000–1500 |
| fuel - propylcarborane | 250–2500 | 500–1500 |
| primary oxidant - water | 300–9000 | 1600–2200 |
| oxidant source material - ammonium nitrate | 10,000–80,000 | 35,000–55,000 |
| excess water | 0–80,000 | 0–40,000 |
| anti-freeze agent - methanol | 0–10,000 | 0–2500 |

The apparatus and methods for inflating an inflatable device described herein can, for example, afford a number of advantages such as those relating to the reduction of:

a) either or both the size and weight associated with the inflator device;

b) concern regarding inadvertent leakages can be reduced or minimized through the utilization of low pressure operation;

c) concern for the oftentimes either or both time-consuming and costly leak checking of stored fluids to ensure adequate performance over the extended lifetime of the inflator device;

d) complexities commonly associated with conventional solid pyrotechnic generant-based inflators such as those related to: thermal stability of such generant materials, possible toxicity complexities associated with certain generant effluents, manufacturing or production complications such as associated with the shaping or formation of such gas generant materials in certain specifically required or desired shapes or forms, the need for certain specific and oftentimes complex ignition systems to ensure reliable desired ignition of such gas generant materials as well the need to deal with troublesome particulate matter present in generated gases and such as may require or result in the incorporation of costly or complicating filtration or other particulate removal techniques.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A combination for use in inflation of an inflatable device, said combination comprising:

a closed storage volume containing a quantity of at least one carborane fuel material and a quantity of at least one primary oxidant and an initiator for initiating combustion of at least a portion of the quantity of the carborane fuel material and at least a portion of the quantity of the primary oxidant to:

form first combustion products including heat and a quantity of a first product fuel species and open said storage volume whereby at least a portion of the first combustion products are released therefrom for inflation of the inflatable device.

2. The combination of claim 1 wherein at least some portion of the at least one carborane fuel is stored in direct contact with at least some portion of the primary oxidant.

3. The combination of claim 1 wherein the at least one carborane fuel is stored at least in part in a gaseous phase.

4. The combination of claim 3 wherein the at least one carborane fuel stored at least in part in a gaseous phase is dicarba-closo-hexaborane.

5. The combination of claim 1 wherein the at least one carborane fuel is stored at least in part in a liquid phase.

6. The combination of claim 5 wherein the at least one carborane fuel stored at least in part in a liquid phase is propylcarborane.

7. The combination of claim 1 wherein the primary oxidant is water.

8. The combination of claim 1 wherein the contents of said closed storage volume are contained at ambient conditions.

9. An apparatus for inflating an inflatable device, said apparatus comprising the combination of claim 1 in further combination with a closed first chamber containing at least a quantity of a supplemental oxidant material, said closed first chamber in fluid communication with said storage volume upon the opening of said storage volume whereby at least a portion of the first combustion products released from said storage volume contact at least a portion of the quantity of the supplemental oxidant material to form inflation gas including second combustion products, said first chamber adapted to open when a predetermined increase in pressure within said first chamber is realized, whereby at least a portion of the inflation gas is released from said first chamber to inflate the inflatable device.

10. The apparatus of claim 9 wherein the supplemental oxidant material is selected from the group consisting of air, oxygen, nitrous oxide, carbon dioxide and mixtures thereof.

11. The apparatus of claim 9 wherein the supplemental oxidant material is stored within said closed first chamber in a liquid-including form.

12. The apparatus of claim 9 additionally comprising a diffuser in fluid communication with said first chamber upon the opening thereof, said diffuser also in fluid communication with the interior of the inflatable device whereby at least a portion of the inflation gas released from said first chamber is communicated to inflate the inflatable device.

13. The apparatus of claim 12 wherein said diffuser forms a secondary combustion chamber wherein a portion of the first combustion products released from said storage volume contact a portion of the quantity of the supplemental oxidant material to form additional inflation gas including additional second combustion products.

14. The combination of claim 1 wherein:
said closed storage volume chamber additionally contains an oxidant source material which, upon thermal initiation contact with the first combustion products, reacts to form a secondary oxidant which, upon combustion reaction contact with the first product fuel species, reacts to form additional gaseous products released therefrom for inflation of the inflatable device.

15. The combination of claim 14 wherein the oxidant source material comprises ammonium nitrate.

16. The combination of claim 15 wherein said closed storage volume chamber further additionally contains an additional oxidant source material which, upon thermal initiation contact with the first combustion products and excess heat from the initiator, produces additional oxygen to oxidize at least one reaction product selected from the group of first combustion products formed upon reaction of the ammonium nitrate.

17. The combination of claim 16 wherein the additional oxidant source material is selected from the group consisting of metallic chlorates, perchlorates, chlorites, hypochlorites and mixtures thereof.

18. An apparatus for inflating an inflatable device, said apparatus comprising:
a closed storage volume containing a quantity of at least one carborane fuel material, a quantity of water and a quantity of at least one decomposable oxidant source material,
an initiator to:
initiate combustion of at least a portion of the quantity of the carborane fuel material and at least a portion of the quantity of water to form first combustion products including heat and a quantity of a first product fuel species; and
initiate decomposition of the decomposable oxidant source material to form an oxidant to react with at least a portion of the first product fuel species to form additional gaseous combustion products;
wherein, said closed storage volume is adapted to open when a predetermined increase in pressure therewithin is realized, whereby at least a portion of the gaseous combustion products is released from said storage volume to inflate the inflatable device.

19. The apparatus of claim 18 wherein the quantity of at least one carborane fuel material and the quantity of water are present in the closed storage volume in an equivalence ratio of about 0.4 to about 1.2.

20. The apparatus of claim 18 wherein the quantity of at least one carborane fuel material and the quantity of water are present in the closed storage volume in an equivalence ratio of about 0.6 to about 1.1.

21. The apparatus of claim 18 wherein the quantity of at least one carborane fuel material and the quantity of water are present in the closed storage volume in an equivalence ratio of about 0.8 to about 1.0.

22. The apparatus of claim 18 wherein at least one decomposable oxidant source material comprises ammonium nitrate.

23. The apparatus of claim 18 wherein the carborane fuel material is at least partially soluble in water.

24. A method for inflating an inflatable device using an inflation apparatus, said method comprising the steps of:
initiating combustion, within the apparatus, of at least a portion of a quantity of at least one carborane fuel material and at least a portion of a quantity of at least one primary oxidant to form first combustion products including heat and a quantity of a first product fuel species and
releasing at least a portion of the first combustion products from the apparatus to inflate the inflatable device.

25. The method of claim 24 wherein the at least one carborane fuel is stored at least in part in a gaseous phase.

26. The method claim 25 wherein the at least one carborane fuel stored at least in part in a gaseous phase is dicarba-closo-hexaborane.

27. The method of claim 24 wherein the at least one carborane fuel is stored at least in part in a liquid phase.

28. The method of claim 27 wherein the at least one carborane fuel stored at least in part in a liquid phase is propylcarborane.

29. The method of claim 24 wherein the primary oxidant is water.

30. The method of claim 24 wherein the at least one carborane fuel material and the at least one primary oxidant are stored within a closed storage volume of the apparatus at ambient conditions.

31. The method of claim 24 additionally comprising the step of:
contacting a stored quantity of a supplemental oxidant material with at least a portion of the first combustion products to form inflation gas including second combustion products.

32. The method of claim 31 wherein the supplemental oxidant material is selected from the group consisting of air, oxygen, nitrous oxide, carbon dioxide and mixtures thereof.

33. The method of claim 24 additionally comprising the steps of:
contacting an oxidant source material with the first combustion products to form a secondary oxidant and
contacting at least a portion of the secondary oxidant with the first product fuel species to form additional gaseous products for the inflation of the inflatable device.

34. The method of claim 33 wherein the oxidant source material comprises ammonium nitrate.

35. The method of claim 34 additionally comprising the step of:
contacting an additional oxidant source material with the first combustion products to produce additional oxygen and
oxidizing at least one reaction product selected from the group of first combustion products and products formed upon reaction of the ammonium nitrate.

36. The method of claim 35 wherein the additional oxidant source material is selected from the group consisting of metallic chlorates, perchlorates, chlorites, hypochlorites and mixtures thereof.

* * * * *